(12) United States Patent
Zhang et al.

(10) Patent No.: US 12,495,314 B2
(45) Date of Patent: Dec. 9, 2025

(54) METHOD AND APPARATUS FOR ARTIFICIAL INTELLIGENCE APPLICATION IN RADIO ACCESS NETWORK

(71) Applicant: Lenovo (Beijing) Limited, Beijing (CN)

(72) Inventors: Congchi Zhang, Shanghai (CN); Le Yan, Shanghai (CN); Mingzeng Dai, Shanghai (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 361 days.

(21) Appl. No.: 18/272,459

(22) PCT Filed: Jan. 14, 2021

(86) PCT No.: PCT/CN2021/071783
§ 371 (c)(1),
(2) Date: Jul. 14, 2023

(87) PCT Pub. No.: WO2022/151163
PCT Pub. Date: Jul. 21, 2022

(65) Prior Publication Data
US 2024/0089752 A1 Mar. 14, 2024

(51) Int. Cl.
*H04W 24/02* (2009.01)
*H04W 24/04* (2009.01)
*H04W 24/08* (2009.01)

(52) U.S. Cl.
CPC .......... *H04W 24/02* (2013.01); *H04W 24/04* (2013.01); *H04W 24/08* (2013.01)

(58) Field of Classification Search
CPC ...... H04W 24/08; H04W 24/04; H04W 24/02
See application file for complete search history.

(56) References Cited

U.S. PATENT DOCUMENTS 10,856,217 B1  12/2020  Young
2013/0229946 A1*  9/2013  Wang ..................... H04W 24/02
370/254

(Continued)

FOREIGN PATENT DOCUMENTS

CN  110913409 A  3/2020

OTHER PUBLICATIONS

O-RAN Alliance, "O-RAN: Towards an Open and Smart RAN", O-Ran Alliance White Paper [retrieved Aug. 8, 2023]. Retrieved from the Internet <https://assets-global.website-files.com/60b4ffd4ca081979751b5ed2/60e5afb502810a0947b3b9d0_O-RAN%2BWP%2BFInal%2B181017.pdf>., Oct. 2018, 19 Pages.

(Continued)

*Primary Examiner* — Syed Ali
(74) *Attorney, Agent, or Firm* — FIG. 1 Patents (57) ABSTRACT

Disclosed are methods and apparatus for artificial intelligence (AI) application in radio access network (RAN). One embodiment of the subject application provides a method performed by a training host (or a wireless network node including a training host) includes receiving a request associated with a wireless network activity, identifying a primary processing model for accomplishing the wireless network activity, and transmitting first information associated with the primary processing model to a second wireless network node to accomplish the wireless network activity, herein the first wireless network node is capable of identifying the primary processing model from a plurality of processing models to accomplish the wireless network activity.

16 Claims, 5 Drawing Sheets

(56) References Cited

U.S. PATENT DOCUMENTS

| | | | |
|---|---|---|---|
| 2016/0021583 A1* | 1/2016 | Bansal | H04W 28/082 |
| | | | 455/436 |
| 2019/0014488 A1* | 1/2019 | Tan | G06N 3/044 |
| 2019/0037487 A1* | 1/2019 | Breuer | H04W 24/08 |
| 2019/0289476 A1* | 9/2019 | Chen | H04L 5/0048 |
| 2019/0297514 A1* | 9/2019 | Pao | H04W 72/0453 |
| 2021/0219363 A1* | 7/2021 | Jiang | H04W 24/08 |
| 2022/0053353 A1* | 2/2022 | Lee | H04B 7/0626 |

OTHER PUBLICATIONS

PCT/CN2021/071783 , "International Preliminary Report on Patentability", PCT Application No. PCT/CN2021/071783, Jul. 27, 2023, 5 pages.

PCT/CN2021/071783 , "International Search Report and Written Opinion", PCT Application No. PCT/CN2021/071783, Oct. 14, 2021, 6 pages.

\* cited by examiner

METHOD AND APPARATUS FOR ARTIFICIAL INTELLIGENCE APPLICATION IN RADIO ACCESS NETWORK

TECHNICAL FIELD

The present disclosure relates to methods and apparatus for artificial intelligence (AI) application in radio access network (RAN).

BACKGROUND OF THE INVENTION

With the commercial operation of 5G, the rich business and innovative applications brought about by 5G make communication network operations facing huge challenges. 5G makes the experience more personalized, services more diversified, and networks more complicated. Traditional operation and maintenance management methods are difficult to adapt to the unprecedented huge network scale of 5G. New demands such as complex network structure, surge in network traffic and diversified dynamic services have become a big bottleneck restricting 5G application promotion and efficiency improvement.

SUMMARY

In some embodiments, a method performed by a training host (or a wireless network node including a training host) includes receiving a request associated with a wireless network activity, identifying a primary processing model for accomplishing the wireless network activity, and transmitting first information associated with the primary processing model to a second wireless network node to accomplish the wireless network activity, herein the first wireless network node is capable of identifying the primary processing model from a plurality of processing models to accomplish the wireless network activity.

In some embodiment, the wireless network activity is at least one of handover decision, power saving decision, load balancing decision, traffic steering decision, mobility optimization decision, traffic load prediction, quality of service prediction, and link quality prediction.

In some embodiments, the method further includes training the plurality of processing models.

In some embodiments, the second wireless network node performs data inference based on at least the primary processing model.

In some embodiments, the first information associated with the primary processing model includes at least one of an index of the primary processing model, an indication of if the processing model is a primary processing model, an identity of the primary processing model, a location of the primary processing model, function of the primary processing model, a list of network activities that the primary processing model is applicable, and requirement for the wireless network activity.

In some embodiments, the method further includes transmitting the primary processing model to the second wireless network node.

In some embodiments, no other training host is linked to the inference host except the training host.

In some embodiments, the method further includes determining at least one secondary processing model associated with the primary processing model for accomplishing the wireless network activity, and transmitting second information associated with the at least one secondary processing model to the second wireless network node, herein the first information further includes a first list of at least one associated secondary processing model.

In some embodiments, the method further includes, for each of the at least one associated secondary processing model in the first list, transmitting second information associated with each of the at least one secondary processing model to the second wireless network node.

In some embodiments, the method further includes transmitting the at least one secondary processing model to the second wireless network node.

In some embodiments, the method further includes transmitting a request for the at least one secondary processing model to a third wireless network node if the first wireless network does not have the at least one secondary processing model.

In some embodiments, the method further includes receiving the at least one secondary processing model from the third wireless network node.

In some embodiments, the method further includes transmitting the at least one secondary processing model to the second wireless network node.

In some embodiments, the method further includes receiving, from the third wireless network node, the second information associated with the at least one secondary processing model.

In some embodiments, the at least one secondary processing model is transmitted by the third wireless network node to a fourth wireless network node, and the second information includes an identity of the fourth wireless network node to be linked with the second wireless network node, and the fourth wireless network node performs data inference based on the at least one secondary processing model.

In some embodiments, the at least one secondary processing model has its own secondary processing model.

In some embodiments, the second information includes at least one of an index of the secondary processing model, an indication whether the processing model is a secondary processing model, an identity of the secondary processing model, a second list of at least one associated secondary processing models owned by the at least one secondary processing model, location of the secondary processing model, function of the secondary processing model, a list of network activities that the secondary processing model is applicable, and requirement for the wireless network activity.

In some embodiments, the primary model or the at least one secondary model demands input from its own associated secondary models.

In some embodiments, a method performed by an inference host (or a wireless network node including an inference host) includes receiving, from a second wireless network node, first information associated with a primary processing model for accomplishing a wireless network activity, receiving the primary processing model in response to that the first wireless network node is not provided with the primary processing model, conducting the wireless network activity with at least the primary processing model, herein the first network node is capable of interacting with other wireless network nodes capable of AI data inference for accomplishing the wireless network activity.

In some embodiments, the wireless network activity is at least one of handover decision, power saving decision, load balancing decision, traffic steering decision, mobility optimization decision, traffic load prediction, quality of service prediction, and link quality prediction.

In some embodiments, the second wireless network node trains a plurality of processing models.

In some embodiments, the first information includes at least one of an index of the primary processing model, an indication of if the processing model is a primary processing model, an identity of the primary processing model, function of the primary processing model, a location of the primary processing model, a list of network entities that the primary processing model is applicable, and requirement for the wireless network activity.

In some embodiments, the method further includes receiving, from the second wireless network node, second information associated with at least one secondary processing model associated with the primary processing model for accomplishing the wireless network activity, herein, the first information further includes a first list of at least one associated secondary processing models, and the second information includes at least one index of the at least one secondary processing model.

In some embodiments, the method further includes receiving, from the second wireless network node, the at least one secondary processing model associated with the primary processing model for accomplishing the wireless network activity.

In some embodiments, the second information further includes an identity of a third wireless network node to be linked with the first wireless network node, and the third wireless network node performs data inference based on the at least one secondary processing model.

In some embodiments, the method further includes interacting with the third wireless network node to demand input from the at least one secondary processing model conducted in the third wireless network node.

In some embodiments, an apparatus includes a non-transitory computer-readable medium having stored thereon computer-executable instructions, a receiving circuitry, a transmitting circuitry, and a processor coupled to the non-transitory computer-readable medium, the receiving circuitry and the transmitting circuitry, and the computer-executable instructions are executable by the processor to cause the apparatus to implement various methods according embodiments of the present application.

BRIEF DESCRIPTION OF THE DRAWINGS

Some exemplary embodiments will now be described, by way of non-limiting examples, with reference to the accompanying drawings.

DETAILED DESCRIPTION

Artificial intelligence has developed rapidly in recent years and has been successfully applied in many traditional industries. If AI is applied to 5G networks, the automation and autonomy of the network can be effectively improved. The evolution of the automatic operation network may clear the way for the commercial deployment and update iteration of 5G.

The intelligence and accuracy of AI need to rely on a large amount of data, and the arrival of 5G can provide AI with a more solid and reliable technical support and operation foundation. 5G networks have large bandwidth, low latency, and massive amounts of data. These characteristics of connection will bring epoch-making applications in all walks of life, and at the same time will produce a large amount of data transmission, retrieval and calculation. AI uses computers and large databases to realize automatic and intelligent control through calculations and judgments so as to simulate human thinking and judgment. The intelligence and accuracy of AI requires a large amount of data, and the arrival of 5G can provide a more solid and reliable foundation for AI.

The present disclosure relates to methods and apparatus for AI application in an RAN.

Figure 1:
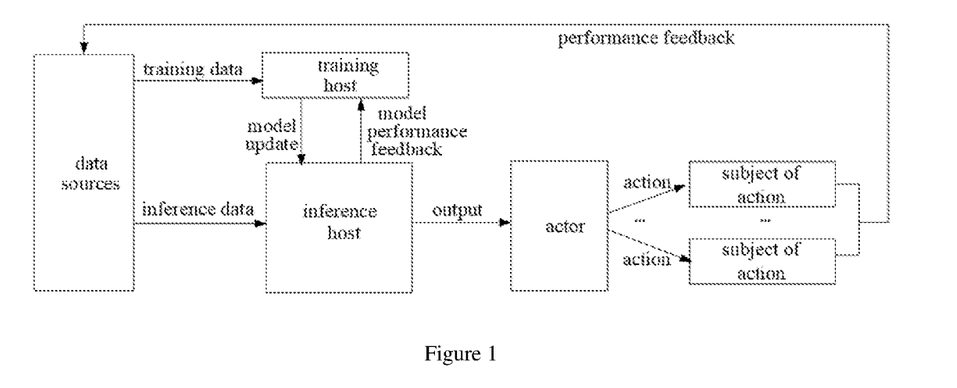
FIG. 1 illustrates a functional framework for radio access network (RAN) AI.

FIG. 1 illustrates a functional framework for RAN AI.

As shown in FIG. 1, there is a training host and an inference host. The training host uses the input training data to train the models in the training host, updates the models and sends the updated models to the inference host. The inference host uses the models provided by the training host to process the input inference data, and output the inference result to the actor, and the actor makes operations according to the inference result. The training host may update the models according to the performance feedback provided by the actor/sub-actors.

However, as the 5G system grows rapidly and becomes more and more complex, network functions becomes more and more diverse and complex, the number of the models may increase rapidly for accomplishing one network activity, wherein one model may demands input from other models. These models might locate in the same network node or in different network nodes.

The present disclosure provides a solution to link different training hosts together for accomplishing a network activity, these models could be located in the same network node or in different network nodes, and one model may demand input from other models. Herein, the different training hosts may interact mutually, and the different inference hosts may interact mutually. They work together to perform a wireless network task/activity.

Figure 2:
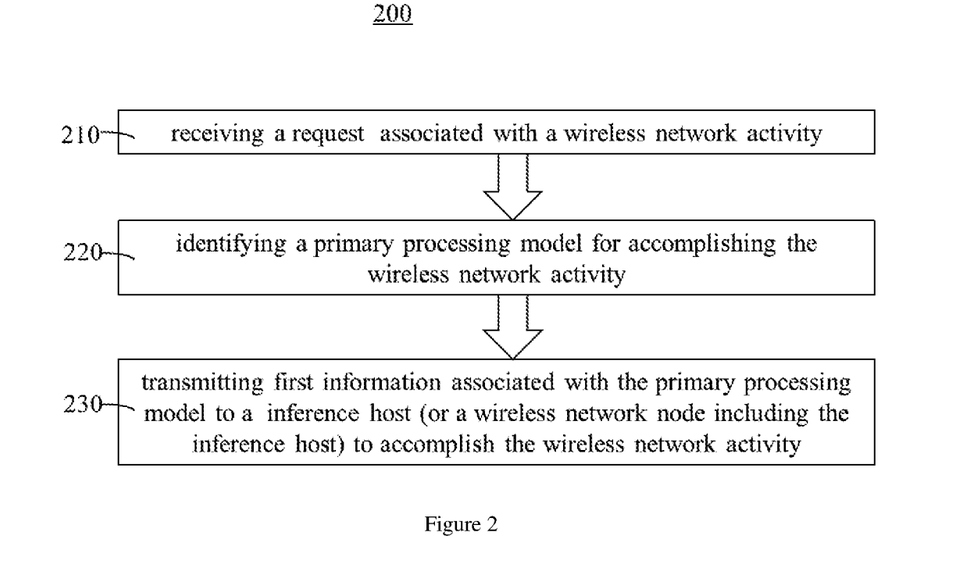
FIG. 2 illustrates an exemplary method according to some embodiments of the present disclosure.

FIG. 2 illustrates a method 200 performed by a training host (or a wireless network node including a training host).

As shown in FIG. 2, the method 200 includes at least an operation 210, an operation 220 and an operation 230. The operation 210 illustrates receiving a request associated with a wireless network activity. The operation 220 illustrates identifying a primary processing model for accomplishing the wireless network activity. The operation 230 illustrates transmitting first information associated with the primary processing model to an inference host (or a wireless network node including the inference host) to accomplish the wireless network activity. Herein, the first wireless network node is capable of identifying the primary processing model from a plurality of processing models to accomplish the wireless network activity.

In some embodiments, the training host (or the wireless network node including the training host) is capable of requesting and retrieving models from other training host (or the wireless network nodes including the other training host) capable of processing model training.

In some embodiments, the processing model may be a model for AI (or machine learning) or the like.

In some embodiments, the wireless network activity is, for example, handover decision (e.g., whether to handover a user equipment (UE) from a source cell to a target cell), power saving decision (e.g., whether the network needs to deactivate some serving cells or beams or functions to save power), load balancing decision (e.g., whether the network needs to steer some traffic from an overloaded cell to a less busy cell), traffic steering decision, mobility optimization decision, traffic load prediction (e.g., what will be the traffic load at a certain cell or a certain UE), quality of service prediction (e.g., what will be the reliability, latency, and data rate performance), and link quality prediction (e.g., whether the link quality between a network and a UE is good or not), and etc.

In some embodiments, the method 200 further includes training the plurality of processing models for AI.

In some embodiments, the request associated with the wireless network activity is from a data broker, or the inference host, some other entities/interface/nodes or etc.

In some embodiments, the inference host is capable of data inference based on processing model, and may perform data inference based on at least the primary processing model.

In some embodiments, the training host and the inference host are in different wireless network nodes or in the same wireless network node.

The training host may locate inside or outside a radio access network (RAN) node.

The wireless network node that includes the training host may be an RAN distributed unit (DU), an RAN central unit (CU), or in an RAN core network (CN). In some embodiments, the training host may be in an access and mobility management function (AMF), an operations, administration, and maintenance (OAM), a network data analytics function (NWDAF), an user plane function (UPF), or a session management function (SMF) in the RAN CN. In some embodiments, there may be one or more training hosts and the training hosts can be co-located or separately located inside or outside the RAN node. For example, the training host for trajectory prediction is located in NWDAF, while the training host for traffic load prediction is located in AMF or CU The inference host may locate inside or outside a radio access network (RAN) node. The wireless network node that includes the inference host may be an RAN DU, an RAN CU, an RAN CN, or etc. In some embodiments, there may be one or more inference hosts, and the inference hosts can be co-located or separately located inside or outside the RAN node. For example, the inference host for link quality prediction is located in DU, while the inference host for handover decision is located in CU.

For example, in some embodiments, both the training host and the inference host are located inside the RAN. For example, the training host is in an RAN CU, and the inference host is in an RAN DU.

The training host is capable of requesting and retrieving models from other training hosts capable of model training in the same wireless network node or in different wireless network nodes.

In some embodiments, the inference host is capable of interacting with other inference hosts capable of data inference for requesting and/or providing result of the execution of processing models.

In some embodiments, the inference host and the other inference hosts are in the same wireless network node or in different wireless network nodes.

In some embodiments, the inference host is associated with (or links to) only the training host and it is not associated with any other training host. The training host may provide processing models that the inference host needs, provide information to the inference host about the processing models that the inference host needs, retrieve and request processing models from other wireless network nodes or training hosts, and provides information about the retrieved or requested processing models to the inference host.

In some embodiments, the training host may be associated with (or links to) at least one inference host and all these inference hosts and/or training hosts may locate in the same wireless network node or in different wireless network nodes.

In some embodiments, the first information associated with the primary processing model includes at least one or combination of an index of the primary processing model, an indication whether the processing model is a primary processing model for accomplishing the wireless network activity, an identity of the primary processing model, location of the primary processing model (e.g., whether the at least one secondary processing model is in the inference host), function of the primary processing model, a list of network activities that the primary processing model is applicable, requirement for the wireless network activity, a policy of feed measurement/data provision, and/or etc.

For example, the wireless network activity is trajectory prediction, the first information may include at least one or combination of an index of the primary processing model, an identity of the primary processing model, function of the primary processing model, a list of network activities that the primary processing model is applicable, requirement for the wireless network activity, a list of requested predictions that the primary processing model is applicable, a prediction accuracy of the primary processing model, a gain/improvement of the prediction accuracy compared to a reference/baseline value or compared to an accuracy of the previous processing model, a policy of feed measurement/data provision.

For example, the policy of feed measurement/data provision further includes at least one of or combination of a list of feed measurement/data needed for the data training/inference, a period of processing model feedback (e.g. the wireless network node including the inference host or data broker provides processing model feedback every period of time), a accuracy/gain threshold that triggers the processing model feedback (e.g. the RAN node triggers processing model feedback only if the accuracy of the current model is below a threshold when comparing the prediction and measurement result), a format of the feed measurement/data (e.g. a batch size or a requested number of logged measurements that need be provided each time), and etc.

In some embodiments, the method 200 further includes transmitting the primary processing model to the inference host (or the wireless network node including the inference host). For example, if the training host determines that the primary processing model is not transmitted to the inference host yet, or the primary processing model is not available in the inference host, the training host transmits the primary processing model to the inference host.

In some cases, the primary processing model needs input from other processing models for accomplishing the wireless network activity. For example, a primary processing model for handover decision may need input from a processing model for traffic load prediction, input from a processing model for link quality prediction, and a processing model for UE trajectory prediction. In these cases, the processing models for traffic load prediction, link quality prediction, and UE trajectory prediction are secondary processing models. And the primary processing model output decision whether to handover from a source cell to a target cell.

In some embodiments, the training host needs to determine at least one secondary processing model for accomplishing the wireless network activity. The primary processing model demands input from the at least one secondary processing model for accomplishing the wireless network activity. In these cases, the first information associated with the primary processing mode further includes a first list of at least one associated secondary processing models for accomplishing the wireless network activity.

In some embodiments, the method 200 further includes, for each of the at least one associated secondary processing model in the first list, transmitting second information associated with each of the at least one secondary processing model to the inference host (or the wireless network node including the inference host).

In some embodiments, the second information includes an index of a secondary processing model, an identity of the secondary processing model, an indication whether the processing model is a secondary processing model, an identity of the secondary processing model, a location of the secondary processing model (i.e., on which inference host that the secondary processing model may be performed, whether the secondary processing model is in the inference host, etc.), function of the secondary processing model, a list of network activities that the secondary processing model is applicable, requirement for the wireless network activity, a policy of feed measurement/data provision (e.g., in what format (e.g., batch size) and on what frequency that the secondary model provides input to the primary model), an index of the associated primary processing model, and/or etc.

In some embodiments, the at least one secondary processing model is available in the training host or is already provided to the inference host.

In some embodiments, if the training host determines that the at least one secondary processing model is not available in the inference host but is available in the training host, the training host may provide the at least one secondary processing model to the inference host (or the wireless network node including the inference host).

In some embodiments, the training host determines that the at least one identified secondary processing model is not available either in the training host or in the inference host. In such cases, the training host may transmit a request for the at least one secondary processing model to at least one another training host (or at least one another wireless network node) for getting the at least one secondary processing model and/or second information associated with the at least one secondary processing model.

Figure 3:
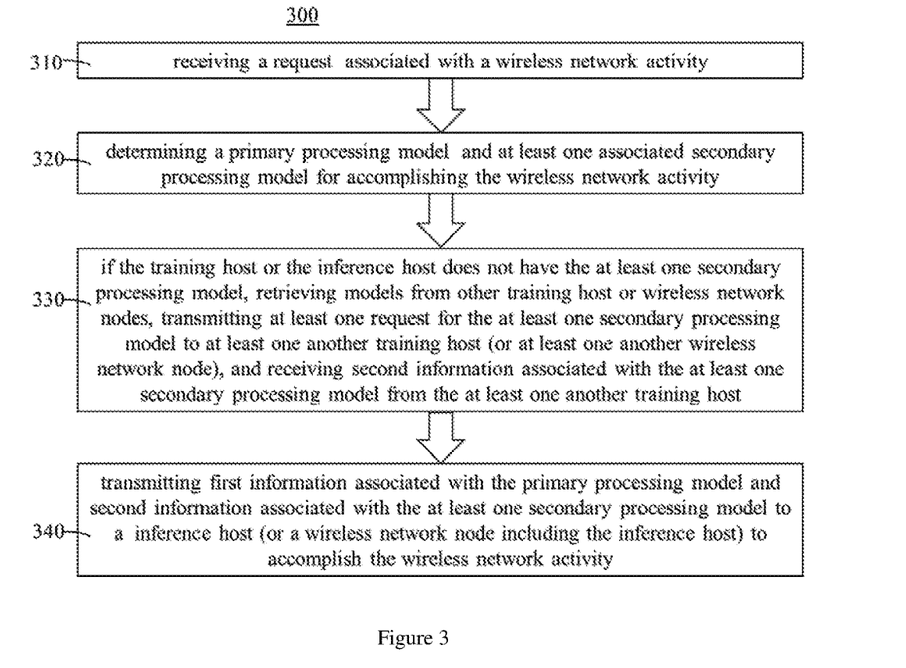
FIG. 3 illustrates an exemplary method according to some embodiments of the present disclosure.

FIG. 3 illustrates a method 300 performed by a training host (or a wireless network node including a training host) based on the method 200.

As shown in FIG. 3, the method 300 includes at least an operation 310, an operation 320, an operation 330, and an operation 340.

The operation 310 illustrates receiving a request associated with a wireless network activity.

The operation 320 illustrates determining a primary processing model and at least one secondary processing model for accomplishing the wireless network activity.

The operation 330 illustrates, if the at least one secondary processing model is not available in either the training host or the inference host, retrieving models from other training host or wireless network nodes, transmitting at least one model request for the at least one secondary processing model to at least one another training host (or at least one another wireless network node) and receiving second information associated with the at least one secondary processing model from the at least one another training host. Herein the training host and the at least one another training host may locate in the same wireless network node or in different wireless network nodes.

The operation 340 illustrates transmitting first information associated with the primary processing model and second information associated with the at least one secondary processing model to an inference host (or a wireless network node including an inference host) for accomplishing the wireless network activity.

In some embodiments, the method 300 may further include receiving at least one secondary processing model from at least one another training host. The training host and the at least one another training host may be in the same wireless network node or in different wireless network nodes. In some embodiments, the method 300 may further include transmitting the at least one secondary processing model received from the at least one another training host to the inference host (or the wireless network node including the inference host).

In some embodiments, the method 300 may further include transmitting the primary processing model and/or the at least one secondary processing model to the inference host, herein the at least one secondary processing model is originally available in the training host or is gotten from at least one another training host.

Figure 4:
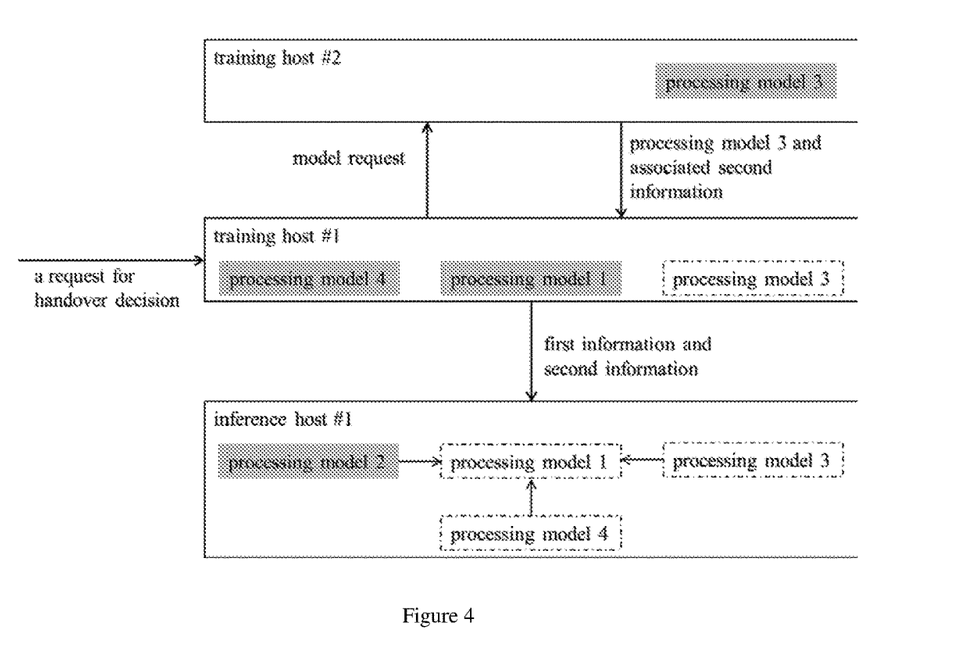
FIG. 4 illustrates an exemplary processing model provision.

FIG. 4 illustrates an exemplary processing model provision.

As shown in FIG. 4, a request for handover decision is sent to training host #1 located in an AMF from an associated inference host #1 located in RAN DU. In this example, the wireless network activity is handover decision.

Training host #1 determines that processing model 1 is the primary processing model for accomplishing the handover decision. The output of primary processing model 1 is to decide whether to handover from a source cell to a target cell.

Besides, to make proper handover decision, processing model 1 demands input such as predicted traffic load in the target cell from processing model 2, input such as predicted link quality of the target cell from processing model 3, and input such as predicted UE trajectory from processing model 4. In this example, processing model 1 is the primary processing model, and processing models 2, 3, and 4 are secondary processing models.

Among these processing models, processing models 1 and 4 are available in training host #1, processing model 2 is already transmitted to inference host #1; processing model 3 is not available in training host #1 and inference host #1, training host #1 retrieves that processing model 3 is available in training host #2, and training host #2 is located in an RAN CU.

Training host #1 transmits a model request to training host #2, training host #2 sent processing model 3 and associated second information to training host #1.

Training host #1 transmits processing models 1, 3, and 4, first information associated with processing model 1, and second information associated with processing models 2, 3, and 4 to inference host #1. The first information indicates that processing models 1 is the primary processing model which demands input from processing models 2, 3, and 4, and the second information indicates that processing models 2, 3, and 4 are secondary processing models.

Inference host #1 conducts these models for accomplishing the handover decision and output the decision whether to handover from the source cell to the target cell.

In some cases, the training host retrieves and finds that the at least one secondary processing model is available in at least one another training host and may be conducted only in at least one another inference host associated with the at least one another training host; in other words, the at least one secondary processing model cannot be conducted or performed in the inference host (or the wireless network node including the inference host) where the primary inference model is conducted. In such cases, when the training host send a model request to the at least one another training host, the at least one another training host only provides second information associated with the at least one secondary processing model to the inference host.

The second information associated with the at least one secondary processing model may further indicates the at least one another inference host where the at least one secondary processing model is located and conducted/performed; i.e., the second information includes an identity of the at least one another inference host to be linked with the inference host or an identity of the wireless network node including the at least one another inference host to be linked with the wireless network node including the inference host. The at least one another inference host performs data inference based on the at least one secondary processing model and provides input to the inference host performing the primary processing model.

In some embodiments, the inference host and the at least one another inference host are associated with the same training host; i.e., the at least one another training host and the training host is the same training host.

In some embodiments, the inference host and the at least one another inference host are associated with different training host.

Figure 5:
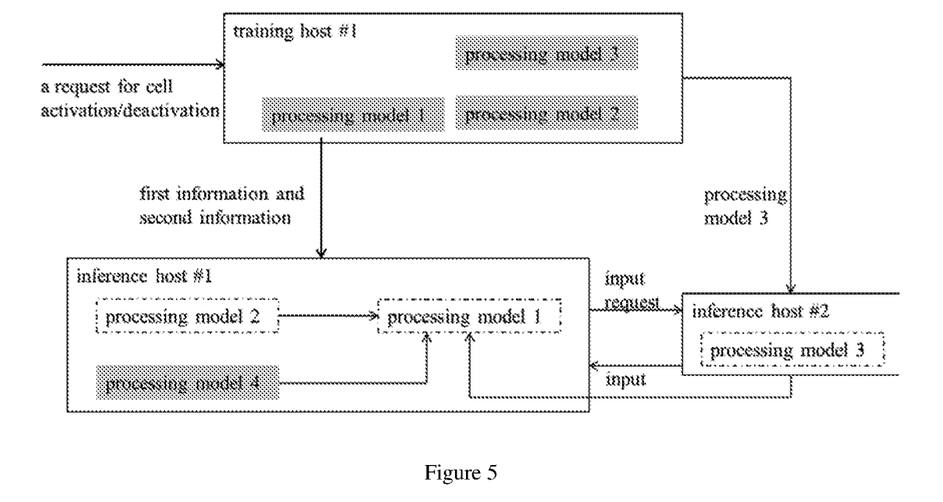
FIG. 5 illustrates an exemplary processing model provision.

FIG. 5 illustrates an exemplary processing model provision.

As shown in FIG. 5, a request for cell activation/deactivation decision is initiated from a data broker located in an RAN DU to a training host #1 located in AMF. Herein, the wireless network activity is cell activation/deactivation decision.

Training host #1 determines processing model 1 as the primary processing model for cell activation/deactivation decision, the output of processing model 1 is to decide whether to activate or deactivate one serving cell.

Besides, to make proper cell activation/deactivation decision, processing model 1 demands input such as predicted traffic load in the cell from processing model 2, input such as predicted link quality in the cell from processing model 3, and input such as predicted UE trajectory from processing model 4. In this example, processing models 2, 3, and 4 are secondary processing models.

Among these processing models, training host #1 determines that processing model 4 is already available in inference host #1, processing models 1, 2, and 3 are available in training host #1, yet processing model 3 can only be conducted in inference host #2 located in the RAN DU. Inference host #1 and inference host #2 are associated with the same training host, i.e., training host #1.

Training host #1 transmits processing models 1 and first information associated with processing model 1 to inference host #1 located in the RAN DU, and indicates that processing models 1 is the primary processing model which demands input from processing models 2, 3, and 4. Besides, training host #1 transmits processing model 2 and second information associated with processing model 2 to inference host #1, and indicates that processing model 2 is secondary processing models.

Regarding processing model 3, training host #1 transmits processing model 3 to inference host #2, and indicates inference host #2 to interact with inference host #1 and input the result of the execution of processing model 3 to inference host #1. Furthermore, training host #1 transmits second information about processing model 3 to inference host #1, which includes an identity of inference host #2 to be linked with inference host #1 and/or an identity of the wireless network node including inference host #2 to be linked with the wireless network node including inference host #1, and indicates processing model 1 to interact with inference host #2 to get input from processing model 3. So that when inference host #1 conducting processing models for cell activation/deactivation decision, it may provide any useful information to inference host #2 for inference host #2 to conduct processing model 3, and it may send input request to inference host #2 for getting the result of the execution of processing model 3.

Figure 6:
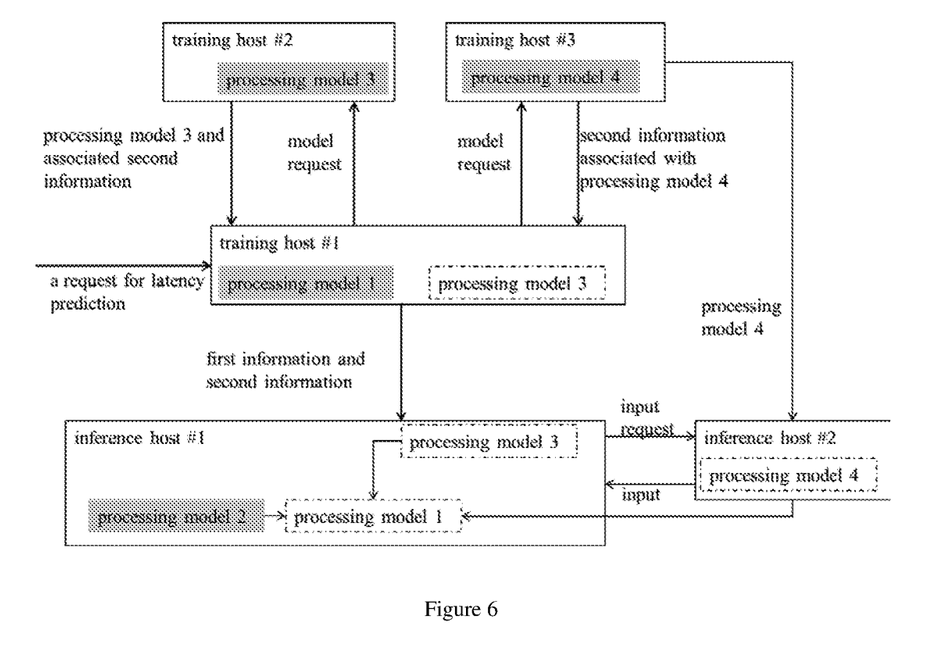
FIG. 6 illustrates an exemplary processing model provision.

FIG. 6 illustrates an exemplary processing model provision.

As shown in FIG. 6, a request associated with latency prediction is sent to training host #1 located in an RAN CU; herein, the wireless network activity is latency prediction.

Training host #1 determines that processing model 1 to be the primary processing model for latency prediction. Besides, to make proper latency prediction, processing model 1 demands input such as predicted traffic load form processing model 2, input such as predicted link quality from secondary processing model 3, and input such as predicted reliability from processing model 4. Training host #1 determines that processing models 2, 3, and 4 are secondary processing models.

Among these processing models, processing model 1 is available in training host #1, processing model 2 is already transmitted to inference host #1 associated with training host #1, processing model 3 and processing model 4 are not available in training host #1. In this example, inference host #1 is located in an RAN DU.

Training host #1 retrieves other training hosts and finds that processing model 3 is available in training host #2 and can be conducted in inference host #1, and processing 4 is available in training host #3 yet can only be conducted in inference host #2 located in the RAN CU.

Training host #1 transmits a model request to training host #2 for getting processing model 3 and associated second information.

Furthermore, training host #1 transmits a model request to training host #3. Training host #3 transmits second information associated with processing model 4 to training host

1. The second information associated with processing model 4 indicates that processing model 4 can only be conducted in inference host #2 associated with training host #3, and includes an identity of inference host #2 to be linked with inference host #1 and/or an identity of the wireless network node including inference host #2 to be linked with the wireless network node including inference host #1.

Training host #1 transmits processing model 1 and associated first information to inference host #1; furthermore, training host #1 transmits processing model 3 and second information associated with processing model 2, 3, and 4 to inference host #1. The first information indicates that processing model 1 is the primary processing model, the second information indicates that processing model 2, 3, and 4 are secondary processing models. Processing model 1 demands input from these three secondary processing models.

Furthermore, training host #3 may indicate inference host #2 to input the result of the execution of processing mode 4 to inference host #1 if inference host #2 receives an input request from inference #1 for accomplishing latency prediction.

Inference host #1 may conducts processing models 1, 2, and 3, and send input request to inference host #2 for getting the result of the execution of processing mode 4. The output of primary processing model is predicted latency.

In the example as shown in FIG. 6, inference host #1 and inference host #2 are associated with different training hosts and are located in different wireless network nodes.

In some embodiments, the at least one secondary processing model has its own secondary processing models; i.e., the at least one secondary processing model has at least one tertiary processing model. In some embodiments, the at least one secondary processing model demands input from the at least one tertiary processing models for accomplishing a wireless network activity. In such cases, the second information associated with the secondary processing model further includes a second list of tertiary processing models.

Figure 7:
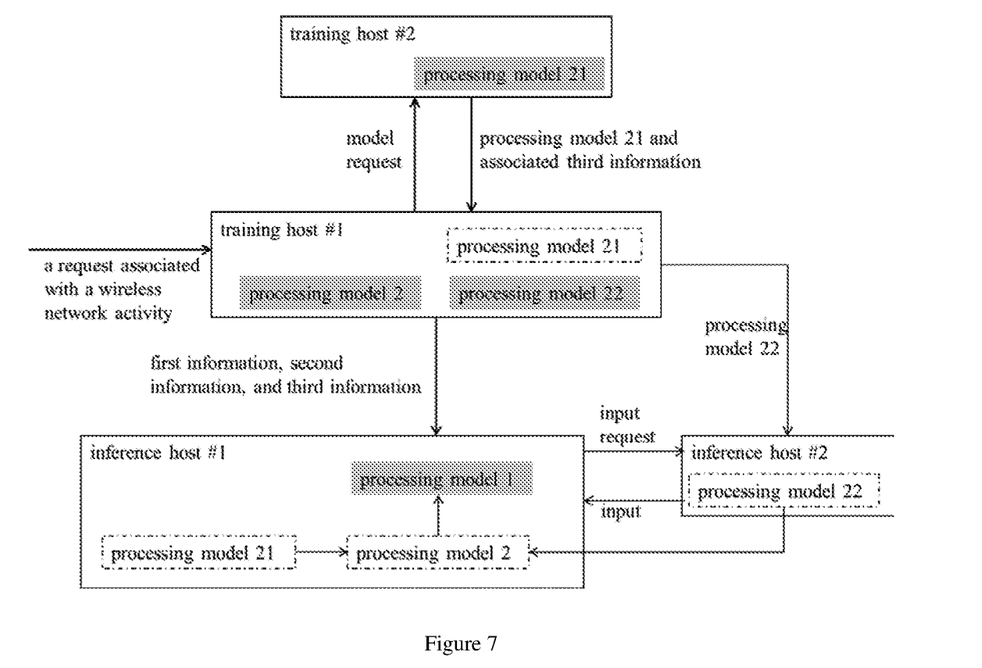
FIG. 7 illustrates an exemplary processing model provision.

FIG. 7 illustrates such an exemplary processing model provision.

As shown in FIG. 7, a request associated with a wireless network activity is sent from a data broker or an inference host to training host #1. Training host #1 determines processing model 1 to be the primary processing model and determines processing model 2 to be the secondary processing model. Furthermore, training host #1 determines that processing models 21 and 22 to be tertiary processing model. Processing model 1 demands input from processing model 2, and processing model 2 demands input from processing models 21 and 22.

Training host #1 get tertiary processing model 21 of processing model 2 from training host #2 and transmits processing model 21 to inference host #1.

Training host #1 determines that tertiary processing model 22 can only be conducted in inference host #2. Accordingly, training host #1 transmits tertiary processing model 22 to inference host #2.

Training host #1 transmits second information associated with processing model 2, third information associated with processing models 21 and 22 to inference host #1.

In some embodiments, the content of the third information is similar with the content of the second information. The third information associated with processing model 22 includes an identity of inference host #2 to be linked to inference host #1 and/or an identity of the wireless network node including inference host #2 to be linked with the wireless network node including the inference host #1.

Training host #2 may indicates inference host #2 to input the execution result of processing model 22 to inference host #1 if inference host #2 receives an input request from inference host #1. And when inference host #1 conducts the wireless network activity based on primary processing model 1, processing model 2, and processing model 21, it may request inference host #2 to input the execution result of processing model 22 to processing model 2.

In the example as shown in FIG. 7, inference host #1 and inference host #2 are associated with the same training hosts, i.e., training host #1. Inference hosts #1 and #2 and training hosts #1 and #2 may be in different wireless network nodes or in the same wireless network node.

In some embodiments, the tertiary processing model and/or the associated third information may be only provided to the inference host where the associated secondary processing model is conducted.

In some embodiments, the tertiary processing model and/or the associated third information may be provided to the inference host where the primary processing model is conducted.

In some embodiments, the tertiary processing model has its own sub level processing models.

In some embodiments, the method 200 may further include an operation of receiving a model request from another training host, and an operation of transmitting information associated with the request processing model to the another training host. The content of the information is similar with the aforementioned first/second/third information.

In some embodiments, the method 200 may further include an operation of transmitting the requested model to the above-mentioned another training host.

In some embodiments, if the requested processing model can only be conducted in an inference host associated with the training host, the training host may not provide the requested processing model to the another training host, and the information associated with the requested processing model may further include the identity of the inference host or the identity of the wireless network node including the inference host to be linked.

Figure 8:
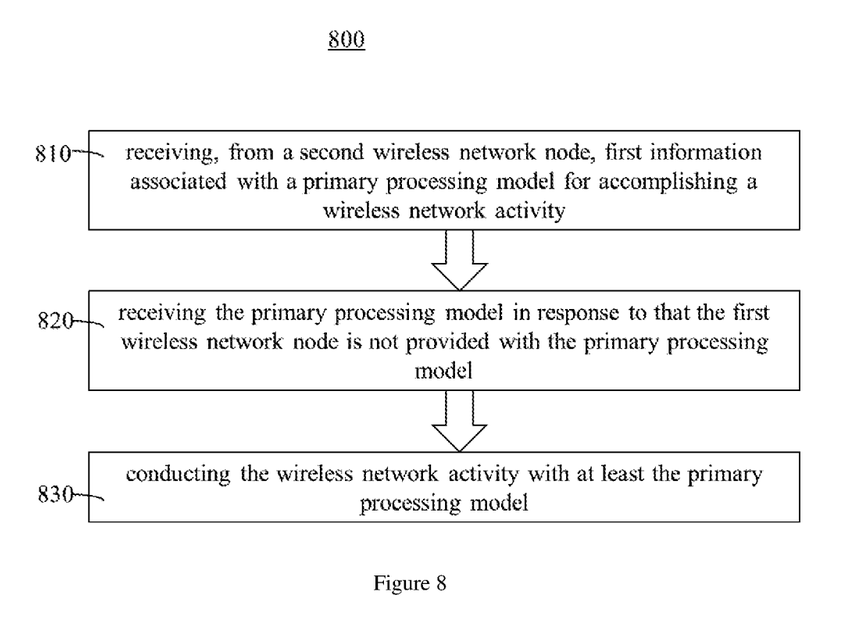
FIG. 8 illustrates an exemplary method according to some embodiments of the present disclosure.

FIG. 8 illustrates a method 800 performed by an inference host (or a wireless network node including an inference host).

As shown in FIG. 8, the method 800 includes three operations 810, 820, and 830. The operation 810 illustrates receiving, from a training host (or a wireless network node including the training host), first information associated with a primary processing model for accomplishing a wireless network activity. The operation 820 illustrates receiving the primary processing model in response to that inference host (or the wireless network node including the inference host) is not provided with the primary processing model. The operation 830 illustrates conducting the wireless network activity with at least the primary processing model. Herein, the first network node is capable of interacting with other wireless network nodes capable of data inference for accomplishing the wireless network activity.

In some embodiments, the wireless network activity is at least one of handover decision, power saving decision, load balancing decision, traffic steering decision, mobility optimization decision, traffic load prediction, quality of service prediction, link quality prediction, and the like.

In some embodiments, the training host trains a plurality of processing models. The processing models may be a model for AI or the like.

In some embodiments, the method 800 further includes receiving, from the training host (or the second wireless network node including the training host), second information associated with at least one secondary processing model associated with the primary processing model for accomplishing the wireless network activity. Herein, the first information further includes a first list of at least one associated secondary processing models, and the second information includes at least one index of the at least one secondary processing model.

In some embodiments, the method 800 further includes receiving, from the training host (or the second wireless network node including the training host), the at least one secondary processing model associated with the primary processing model for accomplishing the wireless network activity.

In some embodiments, the second information further includes an identity of another inference host (or another wireless network node including the another inference host) to be linked with the inference host (or the wireless network node including the inference host), and the another inference host (or the another wireless network node including the another inference host) conducts data inference based on the at least one secondary processing model.

In some embodiments, the method 800 further includes interacting with the above-mentioned another inference host (or the above-mentioned another wireless network node including the above-mentioned another inference host) to demand and receive input from the at least one secondary processing model conducted in the above-mentioned another inference host (or a wireless network node including the above-mentioned another inference host).

In some embodiments, the method 800 further includes receiving at least one tertiary processing model and/or associated third information.

The present disclosure provides a solution for applying AI to a 5G network for accomplishing a wireless network activity such as handover decision, power saving decision, load balancing decision, traffic steering decision, mobility optimization decision, traffic load prediction, quality of service prediction, link quality prediction, and the like.

The present disclosure improves the efficiency and accuracy of the wireless network activity, reduces the cost of the wireless network activity.

Figure 9:
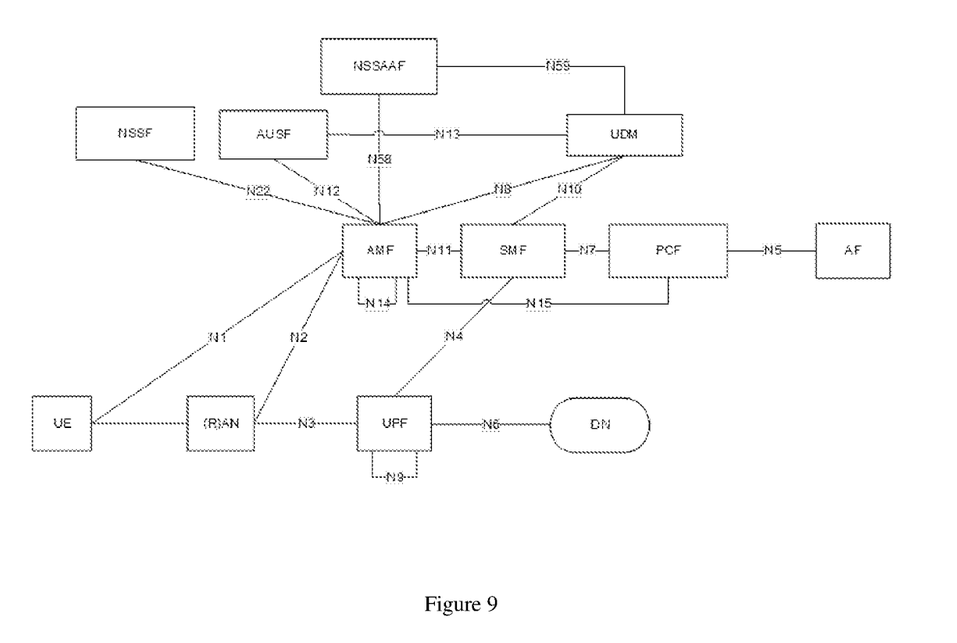
FIG. 9 illustrate architecture of the 5G system according to some embodiments of the present disclosure.

Furthermore, the training hosts and inference hosts of the present disclosure may scatter in various wireless network nodes. FIG. 9 illustrate architecture of the 5G system according to some embodiments of the present disclosure. The training hosts and inference hosts may locate network nodes (e.g., UPF, AMF, RAN (DU or CU not shown in FIG. 9), SMF, and etc.) as shown in FIG. 9.

Therefore, the present disclosure may filter out some wireless network nodes with certain functions according to the characteristics of a certain wireless network activity. Accordingly, the efficiency and accuracy of the wireless network activity may be further improved, and the cost of the wireless network activity may be further reduced.

The spirit of the present disclosure is not limited to the various embodiments, examples, and methods mentioned previously. On the basis of not violating the inventive spirit of the present invention, the above various embodiments in the present invention can be reasonably extended or combined together.

In some embodiments, there would be more sub-level training hosts and inference hosts.

In some embodiments, the training hosts and the inference hosts may interact with each other for accomplishing a wireless network activity.

Figure 10:
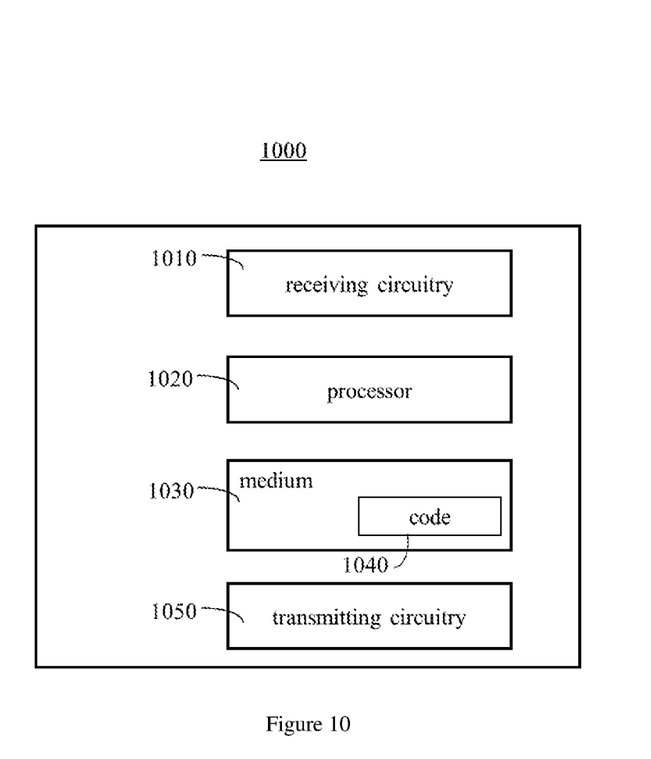
FIG. 10 illustrates an example apparatus according to some embodiments of the present disclosure.

FIG. 10 illustrates an exemplary apparatus 1000 for performing the methods 200, 300 or 800. The apparatus 1000, for example, may be at least a part of a wireless network node (such as an RAN DU, an RAN CU, and etc.) or may be in an RAN CN.

As shown in FIG. 10, the apparatus 1000 may include at least one receiving circuitry 1010, at least one processor 1020, at least one non-transitory computer-readable medium 1030 with computer-executable code 1040 stored thereon, and at least one transmitting circuitry 1050. The at least one medium 1030 and the computer-executable code 1040 may be configured to, with the at least one processor 1020, cause the apparatus 1000 at least to perform at least the example methods 200, 300 or 800 described above, wherein, for example, the apparatus 1000 may be the UE in the example methods 200, 300 or 800.

In various example embodiments, the at least one processor 1020 may include, but not limited to, at least one hardware processor, including at least one microprocessor such as a CPU, a portion of at least one hardware processor, and any other suitable dedicated processor such as those developed based on for example Field Programmable Gate Array (FPGA) and Application Specific Integrated Circuit (ASIC). Further, the at least one processor 1020 may also include at least one other circuitry or element not shown in FIG. 10.

In various example embodiments, the at least one non-transitory computer-readable medium 1030 may include at least one storage medium in various forms, such as a volatile memory and/or a non-volatile memory. The volatile memory may include, but not limited to, for example, an RAM, a cache, and so on. The non-volatile memory may include, but not limited to, for example, an ROM, a hard disk, a flash memory, and so on. Further, the at least non-transitory computer-readable medium 1030 may include, but are not limited to, an electric, a magnetic, an optical, an electromagnetic, an infrared, or a semiconductor system, apparatus, or device or any combination of the above.

Further, in various example embodiments, the exemplary apparatus 1000 may also include at least one other circuitry, element, and interface, for example antenna element, and the like.

In various example embodiments, the circuitries, parts, elements, and interfaces in the exemplary apparatus 1000, including the at least one processor 1020 and the at least one non-transitory computer-readable medium 1030, may be coupled together via any suitable connections including, but not limited to, buses, crossbars, wiring and/or wireless lines, in any suitable ways, for example electrically, magnetically, optically, electromagnetically, and the like.

The methods of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. An apparatus, comprising:
a memory; and
a processor coupled to the memory, the processor configured to cause the apparatus to:
receive a request associated with a wireless network activity;
identify a primary processing model for accomplishing the wireless network activity;
transmit first information associated with the primary processing model from a first wireless network node to a second wireless network node to accomplish the wireless network activity, wherein the first wireless network node is configured to identify the primary processing model from a plurality of processing models to accomplish the wireless network activity;
transmit a request for at least one secondary processing model to a third wireless network node if the first wireless network node does not have access to the at least one secondary processing model;
determine the at least one secondary processing model associated with the primary processing model for accomplishing the wireless network activity; and
transmit second information associated with the at least one secondary processing model to the second wireless network node, wherein the first information further includes a first list of at least one associated secondary processing model.

2. The apparatus of claim 1, wherein the wireless network activity comprises at least one of handover decision, power saving decision, load balancing decision, traffic steering decision, mobility optimization decision, traffic load prediction, quality of service prediction, or link quality prediction.

3. The apparatus of claim 1, wherein the first information associated with the primary processing model includes at least one of:
an index of the primary processing model;
an indication of if a processing model is the primary processing model;
an identity of the primary processing model;
a location of the primary processing model;
function of the primary processing model;
a list of network activities that the primary processing model is applicable; or
requirement for the wireless network activity.

4. The apparatus of claim 1, wherein the processor is configured to cause the apparatus to transmit, for each of the at least one associated secondary processing model in the first list, second information associated with each of the at least one secondary processing model to the second wireless network node.

5. The apparatus of claim 1, wherein:
the at least one secondary processing model is transmitted by the third wireless network node to a fourth wireless network node; and
the second information includes identity of the fourth wireless network node to be linked with the second wireless network node, and the fourth wireless network node performs data inference based on the at least one secondary processing model.

6. The apparatus of claim 1, wherein the at least one secondary processing model has at least one tertiary processing model and demands input from the at least one tertiary processing model.

7. The apparatus of claim 1, wherein the second information comprises at least one of:
an index of the at least one secondary processing model;
an indication whether a processing model is the at least one secondary processing model;
an identity of the at least one secondary processing model;
a second list of at least one associated tertiary processing model;
location of the at least one secondary processing model;
function of the at least one secondary processing model;
a list of network activities that the at least one secondary processing model is applicable; or requirement for the wireless network activity.

8. The apparatus of claim 1, wherein the primary processing model demands input from the at least one associated secondary processing model.

9. An apparatus, comprising:
a memory; and
a processor coupled to the memory, the processor configured to cause the apparatus to:
receive, at a first wireless network node and from a second wireless network node, first information associated with a primary processing model for accomplishing a wireless network activity, wherein the primary processing model is identified from a plurality of processing models to accomplish the wireless network activity;
receive the primary processing model in response to that the first wireless network node is not provided with the primary processing model;
perform the wireless network activity with at least the primary processing model, wherein the first wireless network node is configured to interact with other wireless network nodes capable of data inference for accomplishing the wireless network activity; and
receive, from the second wireless network node, second information associated with at least one secondary processing model associated with the primary processing model for accomplishing the wireless network activity, wherein the first wireless network node does not have access to the at least one secondary processing model, and wherein the first information further includes a first list of at least one associated secondary processing models.

10. The apparatus of claim 9, wherein the wireless network activity comprises at least one of handover decision, power saving decision, load balancing decision, traffic steering decision, mobility optimization decision, traffic load prediction, quality of service prediction, or link quality prediction.

11. The apparatus of claim 9, wherein the first information includes at least one of:
an index of the primary processing model;
an indication whether a processing model is the primary processing model;
an identity of the primary processing model;
function of the primary processing model;
a location of the primary processing model;
a list of network entities that the primary processing model is applicable; or
requirement for the wireless network activity.

12. The apparatus of claim 9, wherein
the second information includes at least one index of the at least one secondary processing model.

13. A method, comprising:
receiving a request associated with a wireless network activity;
identifying a primary processing model for accomplishing the wireless network activity;
transmitting first information associated with the primary processing model from a first wireless network node to a second wireless network node to accomplish the wireless network activity, wherein the first wireless network node is configured to identify the primary processing model from a plurality of processing models to accomplish the wireless network activity;
transmitting a request for at least one secondary processing model to a third wireless network node if the first wireless network node does not have access to the at least one secondary processing model;
determining the at least one secondary processing model associated with the primary processing model for accomplishing the wireless network activity; and
transmitting second information associated with the at least one secondary processing model to the second wireless network node, wherein the first information further includes a first list of at least one associated secondary processing model.

14. The method of claim 13, wherein the wireless network activity is at least one of handover decision, power saving decision, load balancing decision, traffic steering decision, mobility optimization decision, traffic load prediction, quality of service prediction, or link quality prediction.

15. The method of claim 13, wherein the first information associated with the primary processing model includes at least one of:
an index of the primary processing model;
an indication of if a processing model is the primary processing model;
an identity of the primary processing model;
a location of the primary processing model;
function of the primary processing model;
a list of network activities that the primary processing model is applicable; or
requirement for the wireless network activity.

16. The method of claim 13, further comprising transmitting, for each of the at least one associated secondary processing model in the first list, second information associated with each of the at least one secondary processing model to the second wireless network node.

\* \* \* \* \*